(12) United States Patent  
Zur

(10) Patent No.: US 6,618,673 B2
(45) Date of Patent: Sep. 9, 2003

(54) OPTIMIZATION OF IRRIGATION CYCLES

(76) Inventor: Benjamin Zur, 14, Oranim Str., Tivon 36043 (IL)

( * ) Notice: Subject to any disclaimer, the term of this patent is extended or adjusted under 35 U.S.C. 154(b) by 0 days.

(21) Appl. No.: 10/081,581

(22) Filed: Feb. 22, 2002

(65) Prior Publication Data

US 2002/0165700 A1 Nov. 7, 2002

(30) Foreign Application Priority Data

Mar. 4, 2001 (IL) ................................................ 141780

(51) Int. Cl.[7] .............................................. G06F 15/00
(52) U.S. Cl. ........................................ 702/2; 702/188
(58) Field of Search ............................... 702/2, 188, 16; 405/37, 229; 137/78.3, 78.2, 1; 73/73; 700/16; 239/63

(56) References Cited

U.S. PATENT DOCUMENTS

| | | | | |
|---|---|---|---|---|
| 4,876,647 A | * | 10/1989 | Gardner et al. | 700/284 |
| 4,934,400 A | * | 6/1990 | Cuming | 137/78.3 |
| 5,261,765 A | * | 11/1993 | Nelson | 405/128.6 |
| 5,341,831 A | | 8/1994 | Zur | 137/78.3 |
| 5,479,339 A | * | 12/1995 | Miller | 700/16 |
| 5,667,336 A | * | 9/1997 | Zur | 405/37 |
| 5,927,603 A | * | 7/1999 | McNabb | 239/63 |
| 6,079,433 A | * | 6/2000 | Saarem | 137/1 |
| 6,082,932 A | * | 7/2000 | Anderson | 405/229 |
| 6,257,264 B1 | * | 7/2001 | Sturman et al. | 137/1 |
| 6,532,803 B2 | * | 3/2003 | Hutchinson | 73/73 |

* cited by examiner

Primary Examiner—John Barlow
Assistant Examiner—Victor J. Taylor
(74) Attorney, Agent, or Firm—Frishauf, Holtz, Goodman & Chick, P.C.

(57) ABSTRACT

A method for the optimization of irrigation of an area by a plurality of successive adaptive irrigation cycles is disclosed. The method is implemented as a system including an irrigation water controller, a probe for sensing a wetting-front depth, a computerized irrigation cycler, and a computer program running on the cycler. For the first irrigation cycle, input parameters related to the soil and to the wetting front arrival are entered either by default or manually. Data collected during the first irrigation cycle is used for the adaptive optimization of the following irrigation cycles. The steps of the computer program and the wetting-front detection probe are described.

28 Claims, 3 Drawing Sheets

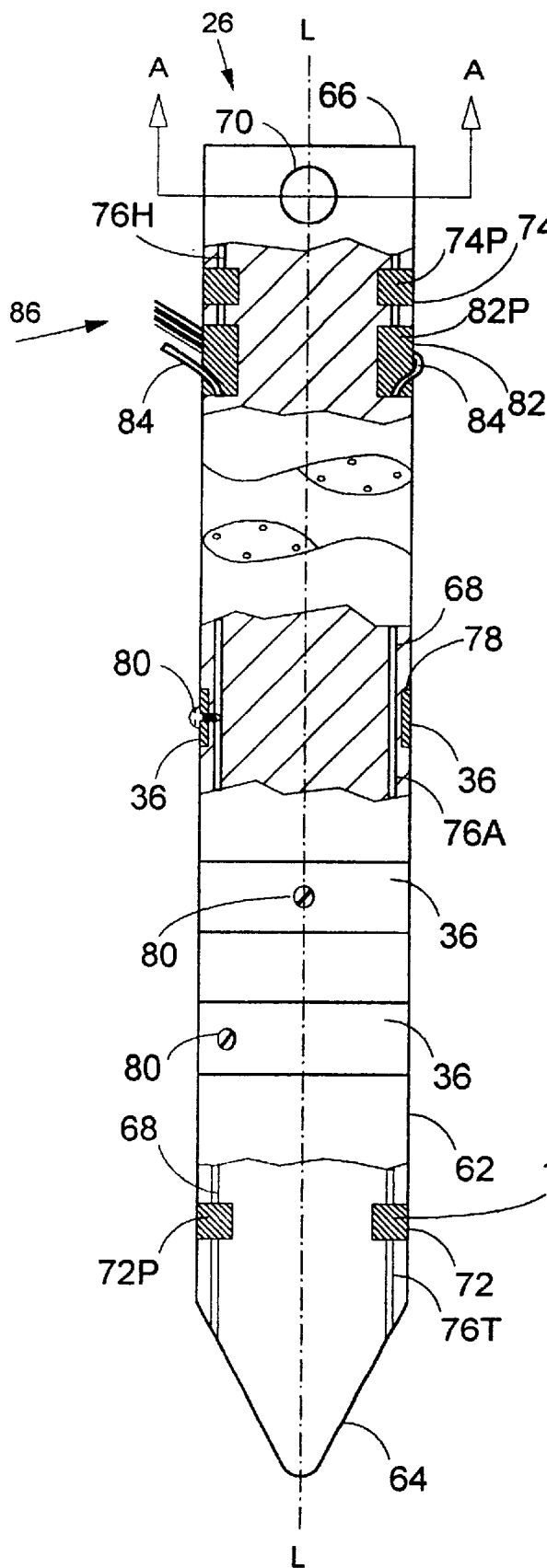
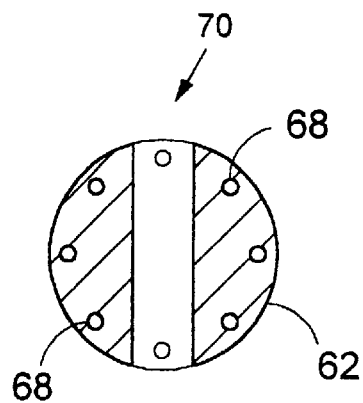
FIG.5
FIG.4

OPTIMIZATION OF IRRIGATION CYCLES

RELATED APPLICATION

The present application claims the benefit of Israel Patent Application Serial No. 141780, filed Mar. 4, 2001, the priority date of which is claimed herein, and the contents of which are incorporated herein in whole by reference.

FIELD OF THE INVENTION

The present invention relates generally to the irrigation of areas and in particular to cycles of irrigation start and cessation for optimizing irrigation efficiency.

BACKGROUND OF THE INVENTION

In a previous U.S. Pat. No. 5,341,831, hereafter '831, incorporated herewith in whole by reference, the inventor B. Zur described an irrigation control method and apparatus. Many other patents refer to irrigation automation but only '831 implements wetting front depth detection. However, time proved that the implementation disclosed by Zur was more of academic value but less valuable for use in the field.

The advance of the wetting front curves referred to in '831 as FIGS. 1 and 2, and the formula for the ratio of $Z_I$ over $Z_F$, including parameters such as water contents, velocity and rate of water application, are not straightforward enough for practical use.

Furthermore, the apparatus for measuring the progress of the wetting front, shown in '831 as FIGS. 3 and 4, is better classified as laboratory equipment, not suited for rough field life. The many parts including rather fragile hydrophilic porous elements, assembled on a single thin bolt, are not sturdy enough to comply with heavy-duty outdoors requirements.

It is therefore desirable to provide a user with a simple push-button method and sturdy reliable equipment for easy start and automatic operation.

It is therefore necessary to provide a method for efficient use of irrigation water, and to implement a wetting-front depth probe for use with such irrigation method. Furthermore, it is also beneficial to implement the method for use with large irrigation systems for water saving purposes.

SUMMARY OF THE INVENTION

It is an object of the present invention to provide a method for the efficient use of irrigation water and to disclose the implementation of such a method for the realization of a probe for the detection of a wetting-front depth and for the implementation of large irrigation systems.

It is also an object of the present invention to provide a system for irrigation of an area by a plurality of successive adaptive irrigation cycles starting with a first irrigation cycle, the system comprising:

- an irrigation controller for initiating and stopping irrigation in response to signals,
- a probe having sensors for detecting arrival of a wetting front, the probe providing signals associated with the detected wetting front depth,
- a cycler comprising a processor, a memory and an I/O unit, the cycler being coupled to the irrigation controller for emitting signals thereto, and the cycler being coupled to the probe for emitting and for receiving signals therefrom,
- a computer program preloaded in the memory of the processor and running on the processor, the processor controlling adaptive irrigation and managing successive irrigation cycles, and the computer program comprising:
    - a predetermined threshold limit $\Delta R$, and
    - a predetermined ratio $G_1$ representing soil texture characteristics.

It is a further object of the present invention to provide a system wherein the computer program further comprises:

- a first initial wetting front depth value $Z_{I1}$ to initiate and stop the first irrigation cycle, and
- a procedure for beginning the first adaptive irrigation cycle to be followed by a plurality of successive adapted irrigation cycles.

It is another object of the present invention to provide system wherein both the predetermined threshold limit $\Delta R$ and the ratio $G_1$ are selected, in combination, from the group consisting of preset default values and of user-selected inputs.

It is moreover an object of the present invention to provide a system wherein the computer program further comprises:

- a first set of instructions for performing preliminary setup for the first irrigation cycle, and
- a second set of instructions for initiating irrigation, for tracking a wetting front depth and for stopping irrigation.

It is furthermore an object of the present invention to provide a system wherein the computer program comprises:

- a third set of instructions for deriving information from a preceding irrigation cycle and for adapting instructions for application to a next irrigation cycle, and
- a fourth set of instructions for beginning the next irrigation cycle and returning to the second set of instructions.

It is yet a further object of the present invention to provide a system wherein the first set of instructions further comprises a first initial wetting front depth instruction for the first irrigation cycle i=1, for calculating a first initial wetting front depth ZIi, to stop irrigation, by the equation ZIi= Gi*ZFi, where ZF is a final wetting front depth input value selected for optimal irrigation.

It is yet another object of the present invention to provide a system wherein the second set of instructions further comprises:

- an irrigation start instruction sent by the processor to the irrigation controller for commanding the irrigation controller to start an irrigation cycle,
- a tracking instruction for tracking the wetting front depth by deriving wetting front depth signals from the probe,
- a detection instruction for detecting a depth signal received by the processor from the probe, the depth signal indicating arrival of the wetting front to the initial depth of irrigation, and
- an irrigation stop instruction sent by the processor to the irrigation controller, the stop signal for commanding the irrigation controller to stop irrigation of an irrigation cycle.

It is also an object of the present invention to provide a system wherein the third set of instructions comprises:

- a drainage pause instruction commanding an irrigation pause for a duration relative at least to the soil texture ratio $G_i$ adapted by the irrigation cycle,
- an actual depth $Z_F$ instruction commanding the processor to derive from the probe an actual derived drainage depth $Z_F$ of the wetting front, a comparison instruction for commanding the processor to compare an actually derived drainage depth of the wetting front $Z_F$ with the selected final drainage wetting front depth value $Z_{Fi}$, a recalculation instruction for calculating an adapted initial wetting front depth $Z_{Ii}$, if the actual derived depth of the wetting front $Z_F$ differs for more than a predetermined margin from the final drainage depth $Z_{F1}$, the recalculation instruction adapting the soil texture ratio $G_i$ and the initial depth of irrigation $Z_{Ii}$ for a next irrigation cycle, and a continue instruction for the third set of instructions to continue to the fourth set of instructions when the actual derived depth of the wetting front $Z_F$ does not differ for more than a predetermined margin from the final drainage depth $Z_{F1}$.

It is also another object of the present invention to provide a system wherein the fourth set of instructions comprises:

a dwell instruction commanding the processor to dwell between successive irrigation cycles, the dwell lasting for a duration relative to at least the adapted ratio G, and an increment instruction commanding the cycler to raise the irrigation cycle number by one and to return to the second set of instructions for starting a next irrigation cycle.

It is also a further object of the present invention to provide a probe for detecting an irrigation wetting-front depth, the probe operating in association with a processor commanding irrigation cycles started and ended by an irrigation controller, the probe comprising:

a monolithic slender dielectric body having a generally smooth symmetrical external surface and a length defining a longitudinal axis, the body extremities consisting of a forward end having a tapered tip and of a rearward end having a head, a plurality of spaced apart parallel thin electrically conductive electrodes accommodated flush with and girdling the external surface of the probe in perpendicular to and in distribution along the longitudinal axis, and a circuitry embedded inside the body of the probe, the circuitry including a plurality of electrical leads at least equal in number to the plurality of conductive electrodes, the electrical leads being arranged adjacent the external surface, parallel to the longitudinal axis and in equally distant radial distribution relative thereto, the electrical leads being electrically coupled to the conductive electrodes and the circuitry being coupled to the processor, for the processor to sample the circuitry and derive a wetting-front depth across one pair of conductive electrodes selected out of the plurality of conductive electrodes.

It is one object of the present invention to provide a probe further comprising a coupling electrically linking each single one conductive electrode out of the plurality of conductive electrodes to only one electrical lead out of the plurality of electrical leads.

It is one further object of the present invention to provide a probe further comprising an insulation for electrically insulating each single one conductive lead out of the plurality of conductive electrodes coupled to one out of the plurality of conductive leads.

It is one other object of the present invention to provide a probe wherein each pair of two adjacent conductive electrodes out of the plurality of conductive electrodes is amenable to form a sensor and to be sampled by the processor.

It is still an object of the present invention to provide a probe wherein the plurality of conductive electrodes is grouped in sets, each set including one pair of adjacent conductive electrodes, and each set being amenable to form a sensor and to be sampled by the processor.

It is still a further object of the present invention to provide a probe wherein any pair of conductive electrodes out of the plurality of conductive electrodes is amenable to form a sensor and to be sampled by the processor.

It is still another object of the present invention to provide a probe wherein the plurality of electrodes is configured for detecting change in soil properties to detect arrival of a wetting front by use of a detection method, selected from the detection methods including impedance, capacitance, radiation and resistance.

It is an additional object of the present invention to provide a probe wherein the plurality of conductive electrodes contacts the soil when the probe is inserted in the ground.

It is a supplementary object of the present invention to provide a probe wherein the monolithic slender dielectric body is made from plastic material.

It is yet an additional object of the present invention to provide a probe wherein the monolithic slender dielectric solid body is extruded.

It is yet a supplementary object of the present invention to provide a method for irrigation of an area by a plurality of successive adaptive irrigation cycles starting with a first irrigation cycle, the method comprising the steps of:

initiating and stopping irrigation with an irrigation controller responsive to signals, detecting arrival of a wetting front with a probe having sensors, the probe providing signals associated with the detected wetting front depth, operating a cycler comprising a processor, a memory and an I/O unit, the cycler being coupled to the irrigation controller for emitting signals thereto, and the cycler being coupled to the probe for emitting and for receiving signals therefrom, running on the processor a computer program preloaded in the memory of the processor, the processor controlling adaptive irrigation and managing successive irrigation cycles, the computer program comprising:

a predetermined threshold limit $\Delta R$, and a predetermined ratio $G_1$ representing soil texture characteristics.

It is also an additional object of the present invention to provide a method wherein the computer program further comprising the steps of:

using a first initial wetting front depth value $Z_{I1}$ to initiate and stop the first irrigation cycle, and running a procedure for beginning the first adaptive irrigation cycle to be followed by a plurality of successive adapted irrigation cycles.

It is also a further object of the present invention to provide a method wherein both the predetermined threshold limit $\Delta R$ and the ratio $G_1$ are selected, in combination, from the group consisting of preset default values and of user-selected inputs.

It is also a supplementary object of the present invention to provide a method wherein the computer program further comprises the steps of:

running a first set of instructions for performing preliminary setup for the first irrigation cycle, and running a second set of instructions for initiating irrigation, for tracking a wetting front depth and for stopping irrigation.

It is one additional object of the present invention to provide a method wherein the computer program further comprises the steps of:

running a third set of instructions for deriving information from a preceding irrigation cycle and for adapting instructions for application to a next irrigation cycle, and running a fourth set of instructions for beginning the next irrigation cycle and returning to the second set of instructions.

It is one supplementary object of the present invention to provide a method wherein the first set of instructions further comprises the steps of using a first initial wetting front depth instruction for the first irrigation cycle i=1, for calculating a first initial wetting front depth $Z_{Ii}$, to stop irrigation, by the equation $Z_{Ii}=G_i*Z_{Fi}$, where $Z_F$ is a final wetting front depth input value selected for optimal irrigation.

It is still an additional object of the present invention to provide a method wherein the second set of instructions further comprises the steps of:

detecting an irrigation start instruction sent by the processor to the irrigation controller for commanding the irrigation controller to start an irrigation cycle, a tracking instruction for tracking the wetting front depth by deriving wetting front depth signals from the probe, inserting a detection instruction for detecting a depth signal received by the processor from the probe, the depth signal indicating arrival of the wetting front to the initial depth of irrigation, and reading an irrigation stop instruction sent by the processor to the irrigation controller, the stop signal for commanding the irrigation controller to stop irrigation of an irrigation cycle.

It is still a supplementary object of the present invention to provide a method wherein the third set of instructions further comprises the steps of:

executing a drainage pause instruction commanding an irrigation pause for a duration relative at least to the soil texture ratio $G_i$ adapted by the irrigation cycle, reading an actual depth $Z_F$ instruction commanding the processor to derive from the probe an actual derived drainage depth $Z_F$ of the wetting front, implementing a comparison instruction for commanding the processor to compare an actually derived drainage depth of the wetting front $Z_F$ with the selected final drainage wetting front depth value $Z_{Fi}$, calculating an adapted initial wetting front depth $Z_{Ii}$, with a recalculation instruction if the actual derived depth of the wetting front $Z_F$ differs for more than a predetermined margin from the final drainage depth $Z_{F1}$, the recalculation instruction adapting the soil texture ratio $G_i$ and the initial depth of irrigation $Z_{Ii}$ for a next irrigation cycle, and applying a continue instruction for the third set of instructions to continue to the fourth set of instructions when the actual derived depth of the wetting front $Z_F$ does not differ for more than a predetermined margin from the final drainage depth $Z_{F1}$.

It is still a further additional object of the present invention to provide a method wherein the fourth set of instructions comprises the steps of:

executing a dwell instruction commanding the processor to dwell between successive irrigation cycles, the dwell lasting for a duration relative to at least the adapted ratio $G_i$, and effecting an increment instruction commanding the cycler to raise the irrigation cycle number by one and to return to the second set of instructions for starting a next irrigation cycle.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 5 is a cross-section along line A—A of FIG. 4.

DESCRIPTION OF THE TABLES

Table 1 ranks drainage ratio values, and

Table 2 presents the steps for the implementation of the method according to the present invention.

DETAILED DESCRIPTION OF PREFERRED EMBODIMENTS

It is the object of the present invention to optimize the irrigation of a planted area by adaptive efficiency improvement derived over successive irrigation cycles.

Figure 1:
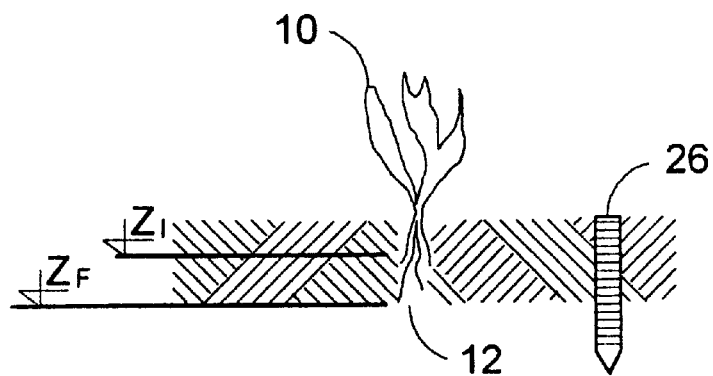
FIG. 1 schematically illustrates nomenclature.

Optimally, irrigation wets the soil to the depth defined as the depth of the root zone of plants. The root zone is the soil depth containing 80% of the roots. Water carried to below the roots of plants is not only useless for plant irrigation purposes but also endangers the pollution of the water table. When irrigation begins, watering descends in the soil starting from the soil level, thus from depth zero. During irrigation, a wetting front is created that penetrates the ground downwards. Referring to FIG. 1, there is shown vegetation 10 with roots 12. A first depth $Z_I$ indicates the initial depth reached by the wetting front at the time irrigation is halted. Thus, the depth called $Z_I$ is in fact the Initial depth at irrigation cessation. Initial, since after the irrigation water flow is stopped, the wetting front continues to drain downwards until it comes essentially to a stop.

The depth at which the wetting front comes to an essential stop is defined as $Z_F$ or the Final drainage depth. It is obvious that irrigation should be halted when the wetting front reaches the initial depth $Z_I$ from where water will drain to reach the optimal depth of irrigation $Z_F$, but not further down. The problem however, is to determine that specific initial wetting front depth $Z_I$ that will ensure the optimal irrigation depth $Z_F$.

It is thus necessary to find the relation between $Z_I$, or depth of the wetting front when the flow of irrigation fluid is stopped, and $Z_F$, which is the final depth at which the wetting front stops descending. That ratio, $Z_I$ over $Z_F$ is defined as G. Thus, G is a simple ratio and not an equation with parameters. As an example, when G is equal to 0.5, then the final wetting front depth $Z_F$ is twice as deep as $Z_I$, the wetting front depth reached when the watering valve is closed. Also, mathematically speaking, when G=1, then there is no drainage at all and the wetting front remains at the same depth as when irrigation stopped. The basic assumption is that the ratio $Z_I$ over $Z_F$ remains essentially constant for a given soil profile. This assumption has been validated by extensive field trials and by unpublished research papers written by the inventor.

Since the exact value of the ratio G is not known in practice, a trial and error process starts. A value is assumed for G by which a wetting front depth $Z_I$ is calculated according to a desired $Z_F$. Then, an irrigation cycle is started and the resulting $Z_F$ is measured. With $Z_I$ and the measured value $Z_F$, it is rather easy to derive the actual ratio G of the soil and to adjust $Z_I$ for a next irrigation cycle. However, many trial and error cycles may be saved thanks to a research program, which provided a range of values for the ratio G.which is summarized as follows.

TABLE 1

| Soil type | G |
|---|---|
| Sandy Soils | 0.45 to 0.60 |
| Loamy Soils | 0.60 to 0.75 |
| Clay Soils | 0.75 to 0.85 |

When aware of the data of Table 1, a proficient operator thus starts with a good educated guess for a first value for the ratio G. However, as will be illustrated below, a push-button start, using a default value for G, is possible. The method described above is applied to irrigation systems in connection with a wetting-front depth probe.

Figure 2:
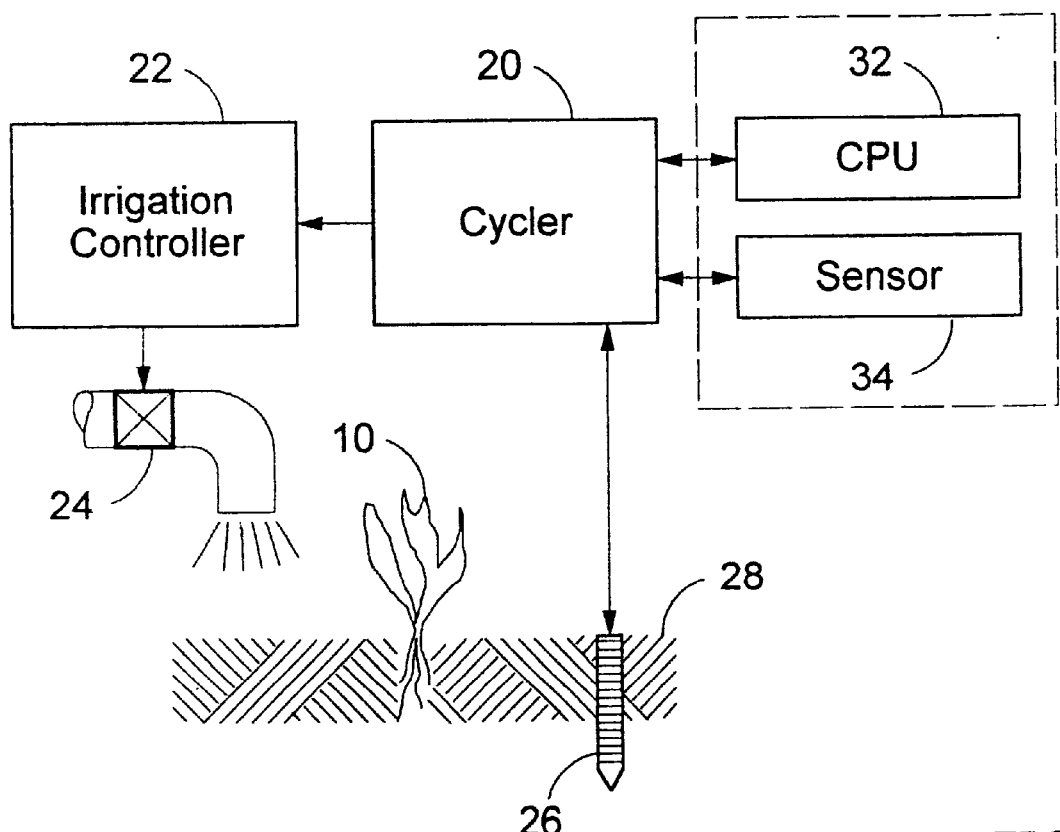
FIG. 2 schematically depicts the system for operating the method.

FIG. 2 schematically illustrates the main elements of the system. An irrigation cycler 20, or cycler 20, is coupled to an irrigation controller 22 commanding a valve 24 that closes or opens the flow of irrigation water. The cycler 20 is also coupled to a wetting front sensing probe 26, imbedded in the soil 28.

The cycler 20 is an instrument comprising circuitry and a processor having at least one from the following components coupled in associative operation therewith, none of which is shown in FIG. 2 for the sake of simplicity comprising: a memory, an I/O unit, interface devices, a real time operating system and preloaded computer programs running on the processor. A detailed description of the cycler 20 follows below. The computer programs are encoded on computer readable medium readable by the processor.

The probe 26 is scanned by the cycler 20 to derive therefrom an indication of the depth of a wetting front resulting from irrigation. The probe 26 that is responsive to the descending progression of the wetting front comprises a plurality of sensing electrodes, not specifically designated in FIG. 2, distributed along the length of the probe 26, at successive discrete depths. The wetting front depth is expressed either as a measure, in cm of depth for example, or as a number indicative of the depth of a sensor below soil level. A detailed description of the probe 26 is provided below.

The various steps of the adaptive irrigation optimization method comprising a succession of irrigation cycles will now be explained with reference to Table 2.

The successive irrigation cycles are indicated as an array i (1, 2, 3, ... n), starting with i=1, i=2, i=3, up to i=n. In the same fashion, the ratio G, and the parameters $Z_I$ and $Z_F$ pertaining to a specific irrigation cycle, are designated with suffixes, as $G_i$, $Z_{Ii}$ and $Z_{Fi}$. For example, for the second irrigation cycle (i=2), a ratio $G_2$ may be derived by division of $Z_{I1}$ by $Z_{F1}$ as obtained from the first irrigation cycle (i=1).

Table 2 lists the steps of the method implemented by the cycler 20. It should be noted that a threshold value $\Delta R$ permits to select the response to the arrival of a wetting front. This threshold value $\Delta R$ is a characteristic related to the physical properties of the soil and ranges from 0 to 0.5.

In step 1, before the first irrigation cycle, an operator has the option to either enter a selected value for the ratio G, usually ranging from 0.4 to 0.9, or to take advantage of a predetermined default value provided by the cycler 20, usually preset to $G_1$=0.6. As stated above, the operator may also select the threshold value $\Delta R$, following which, a first sampling is inherently operated to establish a reference value. This preliminary cycle is definitely not an irrigation cycle and is therefore not counted.

In step 2, the operator uses an input device, not shown in the Figs., to enter the required final wetting front depth $Z_F$, representing root-zone depth, according to the vegetation grown. That depth $Z_F$ is entered either as a number representing units of depth or as an integer relating to a depth-sensing sensor on the probe 26. After these two preliminary setting operations, the cycler 20 derives the depth $Z_{I1}$ for stopping irrigation, in step 3. The cycler 20 now sends a signal to the irrigation controller 22 to start the flow of irrigation, as per step 4. Since it is desired to stop irrigation when the wetting front reaches the depth $Z_{I1}$, the cycler 20 commands the reading of depth-sampling signals from the probe 26, as by step 5. The arrival of the wetting front is indicated by a sensor reading exceeding the threshold value $\Delta R$. Sampling occurs at predetermined intervals, to derive the depth of the wetting front for example, every couple of minutes. The sampling frequency may be related to time, to the ratio G, or to both time and to the ratio G.

Each returned wetting front depth signal is filtered: if the depth Z (depth of the wetting front at time t) is less than the required depth $Z_{Ii}$ then irrigation continues (see step 6). Else, when the wetting front reaches the depth $Z_{I1}$, the cycler 20 sends an irrigation-stop signal to the irrigation controller 22 to close the irrigation flow, as seen in step 7.

After a pause P of a predetermined duration, in step 8, the final drainage wetting front depth is derived by the cycler 20 from the probe 26. The pause duration is related either to time, or to the ratio G, or to a combination thereof. If the actual derived value for $Z_{Fi}$ is found by step 9 to be smaller or larger than the desired $Z_F$, this means that, correspondingly, too less or too much water was delivered. Thus, for the next irrigation cycle i+1, a corrected value of $G_{i+1}$ should be used. In addition, it is evident that a corrected G will alter the value of $Z_I$ since the desired $Z_F$ is constant. Else, still by step 10, if $Z_{Fi}$ is found appropriate, nothing changes and the same previous value is used. The cycler 20 now resets $G_i$ if needed, and then $Z_{Ii}$, according with the equations of step 10. Evidently, these adjustments take into account the sensing resolution limits of the probe 26.

Now, in step 11, a dwell period, in between consecutive irrigation cycles, starts and ends. Details about the dwell period are provided below. In step 12, the index of the cycle is increased by one, indicating a new irrigation cycle i+1. Accordingly, control returns to step 4, for the next cycle.

TABLE 2

| SET | Step # | STEP | COMMENTS |
|---|---|---|---|
| I | 1 | $\Delta R$ | $\Delta R$: default sensor threshold value, either default or selected, in the range 0 < $\Delta R$ < 0.5 |
| | | $G_1$ | $G_1$: soil texture ratio, either default or selected, in the range 0.5 < $G_1$ < 1.0 |

TABLE 2-continued

| SET | Step # | STEP | COMMENTS |
|---|---|---|---|
| | | i = 1 | i: irrigation cycle number |
| | 2 | Input $Z_F$ | $Z_F$ = desired final drainage wetting front depth |
| | 3 | $Z_{Ti} = G_i * Z_{fi}$ | $Z_{Ti}$ = first initial depth of irrigation end. |
| II | 4 | Start irrigation | |
| | 5 | Track Z | Z = wetting front depth |
| | 6 | if Z < $Z_{Ti}$ GO TO 5; else: continue | Track until $Z_{Ti}$ is reached |
| | 7 | Stop irrigation | When Z = $Z_{ti}$ |
| III | 8 | Pause for P | Pause period P = f ($G_i$) |
| | 9 | Derive $Z_{fi}$ | $Z_{Fi}$ = actual derived wetting front depth |
| | 10 | if $Z_F$ = $Z_{Fi}$ GO TO 11; | If within margin: no change for further irrigation cycles |
| | | else $G_i = Z_{Ti}/Z_F$ | Derive $G_i$, for next irrigation cycle |
| | | and $Z_{Ti} = G_i * Z_{fi}$ | Derive $Z_{Ti}$ for next irrigation cycle |
| IV | 11 | Dwell for D | Dwell period D = f ($G_i$) |
| | 12 | i = i + 1; GO TO 4 | Increment irrigation cycle number. Next irrigation cycle |

Attention is now returned to step 11 and to Table 2, regarding the dwell period D in between successive irrigation cycles. The length of that dwell period D may be defined according to either one sole parameter such as time, or according to many different parameters, either alone or in combination, comprising or depending from, for example:

a) a safety limit value never to be trespassed, or a duration depending also at least in part, of the:

b) season of the year, c) type of soil 28 d) kind of vegetation growing on the area, e) data received from an external computer, f) data received from at least one external sensor, g) wetting front depth measurements by the probe 26, h) preloaded computer program running on the processor of the cycler 20 or on any other computer coupled to the cycler 20.

There is thus a range of various parameters possibly influencing the determination of the dwell period D, the simplest being to merely use a timer to count hours or just wait for a command from an external computer. A more sophisticated option may encompass a computer program taking into account various parameters as listed above, as well as statistical and other information received from a remote computer, and so on. Furthermore, there may always exist more than just one condition for the dwell period D.

Figure 3:
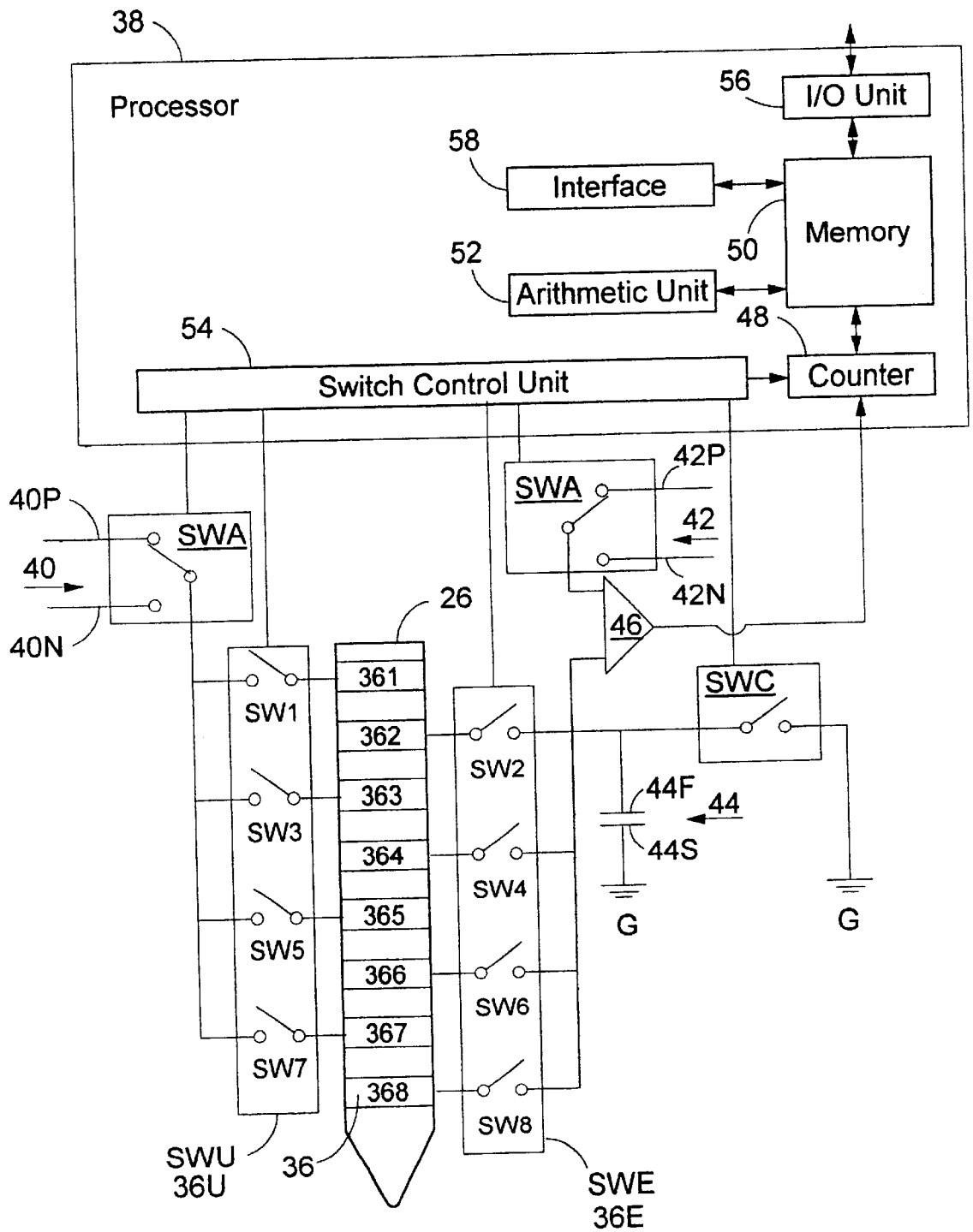
FIG. 3 is a schematic presentation of an electrical diagram related to an element of FIG. 2, FIG. 4 schematically illustrates an implementation of another element pertaining to FIG. 2.

The cycler 20 will now be described in more details with reference to FIG. 3. The cycler 20 is a processor-based instrument comprising circuitry for coupling to the probe(s) 26 and eventually, circuitry for interfacing with external devices. FIG. 3 mainly shows circuitry, the probe 36 and the processor 38.

The processor 38 periodically polls the probe 26 to derive therefrom the depth of the wetting front. Probe 26, equipped with a plurality of electrodes 36, is implanted in the soil 28, to detect this wetting front via direct contact with the soil 28. The wetting front depth derivation is based on either impedance, resistance, capacitance, ion flow or any other practical principle relative to soil properties change. Since the properties of the soil 28 vary with the arrival of a wetting front, a difference in measurement indicates arrival thereof. Measurement is always relative and effected between two specific electrodes 36 out of the plurality of electrodes 36 that are coupled to the processor 38. Details regarding the probe 26 follow below.

As an example only, the circuit 100 shown in FIG. 3 measures the relative electrical resistance between two electrodes 36 chosen from the array of electrodes ranging from 361 to 368. The measurements rest on the fact that the time needed to charge a capacitor is proportional to the known value of the capacitor and to the unknown resistance to be measured. Knowledge of the time needed to charge a capacitor to a preset voltage enables the calculation of the resistance. Each measurement is implemented in five stages:

a) discharge of the capacitor by short circuiting thereof, b) charge of the capacitor, to a preset positive voltage, by connection to a positive DC voltage source via the resistance presented between two electrodes, and measurement of the time needed to charge the capacitor, c) discharge of the capacitor by short circuiting thereof, d) charge of the capacitor to a preset negative voltage, by connection to a negative DC voltage source via the resistance prevalent between two electrodes, and measurement of the time needed to charge the capacitor, e) calculation of the mean value of the times measured in the steps b) and d) and use of that mean value of time to calculate the value of the relative resistance between the two electrodes.

This five-step method is implemented by the circuitry shown in FIG. 3, where the probe 26 is shown with, for example, eight electrodes 36, numbered from 361 to 368.

To keep the explanations and FIG. 3 simple, the example depicted in FIG. 3 is not only limited to eight electrodes 36 but also, the relative resistance measurements are taken only for each one of the consecutive four pairs of electrodes. Relative resistance is thus measured between the first electrode 361 and the second electrode 362, between the third electrode 363 and the fourth electrode 364, the fifth electrode 365 and the sixth electrode 366, etc. Evidently, it is possible to implement the same method for measurements between any two adjacent electrodes, thereby achieving seven measurements covering a different range of depth for the same total number of eight electrodes. This means that the relative resistance is measured, for example, between the first electrode 361 and the second electrode 362, between the second electrode 362 and the third electrode 363, between the third electrode 363 and fourth electrode 364 and so on. Furthermore, it is possible to measure relative soil resistance between any two electrodes of the probe 26, for example, between the first electrode 361 and the eighth electrode 368.

In the circuit depicted in FIG. 3, a first switch SWA, and a second switch SWB command a change of polarity. Both switches SWA and SWB always connect the polarity of the same sign to, respectively, a charging voltage 40 coupled to the switch SWA, and a reference voltage 42 coupled to the switch SWB. The polarity is positive when the first switch SWA is connected to the positive charging voltage 40P and the second switch SWB, is connected to the positive reference voltage 42P. For negative polarity, the first switch SWA and the second switch SWB must be coupled to the negative voltages, respectively, 40N and 42N. In FIG. 3, both switches SWA and SWB are set to positive polarity.

Still, in FIG. 3, the first switch SWA is coupled, in parallel, to the group of uneven-numbered electrodes designated as 36U, namely 361, 363, 365 and 367. The group comprising the even-numbered electrodes 36E, thus 362, 364, 366 and 368, all connected in parallel, is connected to a first plate of a capacitor 44F. The second plate of the capacitor 44S is grounded. A third switch SWC is coupled between the first plate of the capacitor 44F and the ground GR. When closed, the third switch SWC permits the discharge of that capacitor 44, by connection to the ground GR, as well as the grounding of all the even-numbered electrodes 36E.

Now the even-numbered electrodes 36E, numbered from 362 to 368, are also linked to a first input 461 of a voltage comparator 46. The second switch SWB, which is electrically coupled to the reference voltage, is connected to a second input 462 of the voltage comparator 46.

In operation, the following steps occur successively.

a) The third switch SWC is closed to discharge the capacitor 44.

b) After discharge of the capacitor 44, the third switch SWC is opened. Next, positive polarity is chosen by setting the first switch SWA and the second switch SWB to, respectively, 40P and 42P. Now the switch SW1 and the switch SW2 are closed, to measure the resistance across the first and the second electrode of the probe 26, designated as, respectively, 361 and 362. The closure of the first two electrode switches SW1 and SW2 resets and starts a counter 48 that runs while the capacitor 44 charges. Now, when the voltage on the capacitor 44 reaches the level of the reference voltage 42, then the voltage comparator 46 emits a stop signal. That stop signal halts the counter 48 and transfers the counter reading to the memory 50. Both first two electrode-switches SW1 and SW2 are now opened.

c) Step a) is repeated: The third switch SWC is closed and the capacitor 44 discharges.

d) Step b) is repeated for the negative polarity, thus with the first switch SWA and SWB linked, respectively, to 40N and 42N. Again, the reading of the counter 48 is saved in memory 50.

e) The arithmetic unit 52 calculates the mean value of both counter readings stored in memory 50, and uses this result to calculate the value of the relative resistance across both first two electrodes 361 and 362.

The same steps are now repeated for the next pair of electrodes. The resistance of the soil 28 is thus measured at different depths along the length of the probe 26. Before the start of irrigation, the measured resistances represent values say, for dry ground. After the start of the gradual descent of the wetting front, when the soil 28 becomes wet, smaller resistance measurements are read, indicating wet soil.

The description of the processor 38 is only schematic since processors are well known to the art. Some components of the processor 38, depicted in FIG. 3, comprise: the counter 48, the memory 50, the arithmetic unit 52, a switch control unit 54, an I/O unit 56, and optionally, at least one interface 58. It should be noted that the switch control unit 54 is illustrated as commanding the even-numbered numbered switches SWE and the uneven-numbered numbered switches SWU each as a group, but only to ease explanations. Every single switch may evidently be controlled separately, to allow measurement of resistance between any chosen electrodes 36.

The I/O unit accepts input from an operator, via a selected input device, displays results on a chosen output device, and optionally, provides printouts. Neither the operator nor the input and output devices, nor the printout unit is shown in FIG. 3.

The interface 58 provides for optional communication with one or more of the following: external sensor, external computer, network and external memory facility.

The power supply and the operation switch for starting the cycler 20 are not shown in FIG. 3 for the sake of simplicity. The wetting front depth sensor 26, or probe 26, is now described in more detail with reference to FIGS. 4 and 5.

The probe 26 is substantially a monolithic slender body 60, shaped in the form of a spike and featuring electrodes 36 on the outside. Preferably cylindrical, the longitudinal axis of symmetry of the probe 26 is designated as the line L—L in FIG. 4. The length of the probe 26 varies depending on needs, for example between 30 cm to two meters. The external surface 62 of the probe 26 is substantially smooth and terminated by a tapered tip 64, to ease penetration into the ground. The probe 26 terminates preferably in a flat head 66, perpendicular to the longitudinal axis L—L.

To convey electrical signals to the electrodes 36, a plurality of electrical conductive leads 68, such as bare copper wires or rods, are embedded inside the body 60 adjacent the outer surface 62, in predetermined spaced apart distribution about the longitudinal axis L—L, as better seen in FIG. 5. Preferably, the leads 68 are distanced equally apart and pass from the head 66 to the tip 64.

The probe 26 is preferably extruded from engineering plastic material, while the leads 68 are embedded inside the body 60 concurrently with the extrusion process. The extruded product is then first cut to desired length and then, further processed. A tapered tip 64, a flat head 66 and a diametrical bore 70, perpendicular to the axis L—L may be machined on the body 60. The bore 70 is advantageous for retrieval of the probe 26 from the ground: a crossbar inserted through the bore 70 allows for a better pull.

Since each one of the plurality of leads 68 may convey an electrical signal related to a specific electrode 36, it is important to prevent short-circuiting of the leads 68, as may happen at exposed surfaces such as the tip 64, at the head 66 and inside the bore 70, where the leads 68 lay bare. To insulate the bare ends of the leads 68, a first circumferential tip-insulating groove 72 is cut near the tip 64, below the lowermost electrode 36 but above the tapered tip 64, and a second circumferential head-insulating groove 74 is cut near the head 66, above the uppermost electrode 36 but below the bore 70. Both grooves 72 and 74 cut through the electrical leads 68 to a depth just below the innermost portion of the leads 68 and divide each lead 68 in three electrically separated portions: a tip portion 76T, an active portion 76A and a head portion 76H. Both insulating grooves 72 and 74 are filled with potting material, respectively 72P and 74P, flush to the outer surface of the body 60. Thereby, the active portion 76A of each lead 68 is duly insulated from the surroundings and the smooth external surface of the probe is retained.

An electrode is formed by inserting a conductive band in a shallow circumferential groove 78 cut on the external surface of the body 60, in perpendicular to the longitudinal axis L—L. The depth of the groove 78 is shallow enough to prevent exposure of the buried leads 68. A metal screw 80 pierces the electrodes 36 and electrically couples one electrode with a lead 68. When the probe 26 is buried in the soil 28, the head of the screw 80 and the electrode 36 contact the soil and close an electric path, through the threads of the screw, to a chosen lead 68.

The preferred implementation of FIG. 4 thus depicts an electrode 36 in the form of a girdling band made from a thin conductive metal strip, such as metal, wound around the body 60, inside a shallow circumferential groove 78 configured to fit the metal strip. Preferably, the electrode 36 is made from non-corrosive material. The depth of the groove 78 fits the thickness of the metal strip 36, to remain flush with the external diameter of the body 60. One or more electrically conductive assembly elements 80, such as screws, may now be inserted radially, in perpendicular to the longitudinal axis L—L, from the external surface 62 for electrically conductive engagement with a chosen lead 68. Evidently, one electrode 36 is coupled to one lead 68, but more than one assembly element may be used.

It is now required to create a conductive path from an electrode 36 through a lead 68 to the cycler 20. This is achieved by circumferentially cutting open a coupling groove 82 in the body 60, above the uppermost electrode but below the groove 74, of a depth sufficing to lay bare and provide access to all the electrodes 36. Each separate electrode is then coupled to one wire 84, say by soldering, bonding, crimping or any other electrically conductive means known to the art, and properly insulated. Those wires 84 are then packaged as a harness 86 for coupling to the cycler 20. The coupling groove 82 is then insulated and filled with potting 82P, encapsulated or covered by any other means known to the art. The coupling groove 82 may render the second head-insulating groove 74 superfluous, depending on requirements and preferences for the connection to the wires 84.

In the field, the probe 26 is inserted in the soil 28 either somewhat protruding, or flush therewith. After drilling a leading bore, of a diameter narrower than the diameter of the probe 26, hammering on the head 66 is permitted, either directly or by use of a protective cap covering the head, since the monolithic body 60 is sturdy enough to endure shock.

It should be noted that wireless communication between the probe 26 and the cycler 20 is feasible, provided suitable transmitters are coupled to both the probe 26 and the cycler 20.

The present invention thus discloses a method for efficient use of water for irrigation. That method is implemented as a system for irrigation comprising a probe, or irrigation device for use in the irrigation systems.

The advantages of the present invention are self-evident: a simple method with durable and sturdy equipment easy to operate. Minimal and available inputs are requested from the operator of the system that is designed for rough field use.

Those skilled in the art will appreciate that various modifications and changes may be applied to the preferred embodiment of the invention as hereinbefore exemplified, without departing from its scope as defined in and by the appended claims. For example, it is possible to couple more than one probe 26 to one cycler 20 to obtain more data. In addition, a sealable connector may be connected to the harness 86 permitting to leave the probe 26 imbedded in the soil 28. Furthermore, the cycler 20 may also be coupled to external processors as well as to processing networks and communication networks.

What is claimed is:

1. A system for irrigation of an area by a plurality of successive adaptive irrigation cycles starting with a first irrigation cycle, the system comprising:
    an irrigation controller for initiating and stopping irrigation in response to signals,
    a probe having sensors for detecting arrival of a wetting front, the probe providing signals associated with the detected wetting front depth,
    a cycler comprising a processor, a memory and an I/O unit, the cycler being coupled to the irrigation controller for emitting signals thereto, and the cycler being coupled to the probe for emitting and for receiving signals therefrom,
    a computer program preloaded in the memory of the processor and running on the processor, the processor controlling adaptive irrigation and managing successive irrigation cycles, and the computer program comprising:
        a predetermined threshold limit $\Delta R$, and
        a predetermined ratio $G_1$ representing soil texture characteristics.

2. The system according to claim 1, wherein the computer program further comprises:
    a first initial wetting front depth value $Z_{I1}$ to initiate and stop the first irrigation cycle, and
    a procedure for beginning the first adaptive irrigation cycle to be followed by a plurality of successive adapted irrigation cycles.

3. The system according to claim 1, wherein both the predetermined threshold limit $\Delta R$ and the ratio $G_1$ are selected, in combination, from the group consisting of preset default values and of user-selected inputs.

4. The system according to claim 1, wherein the computer program further comprises:
    a first set of instructions for performing preliminary setup for the first irrigation cycle, and
    a second set of instructions for initiating irrigation, for tracking a wetting front depth and for stopping irrigation.

5. The system according to claim 1, wherein the computer program comprises:
    a third set of instructions for deriving information from a preceding irrigation cycle and for adapting instructions for application to a next irrigation cycle, and
    a fourth set of instructions for beginning the next irrigation cycle and returning to the second set of instructions.

6. The system according to the claim 4, wherein the first set of instructions further comprises:
    a first initial wetting front depth instruction for the first irrigation cycle i=1, for calculating a first initial wetting front depth $Z_{Ii}$, to stop irrigation, by the equation $Z_{Ii}=G_i{}^*Z_{Fi}$, where $Z_F$ is a final wetting front depth input value selected for optimal irrigation.

7. The system according to claim 4, wherein the second set of instructions comprises:
    an irrigation start instruction sent by the processor to the irrigation controller for commanding the irrigation controller to start an irrigation cycle,
    a tracking instruction for tracking the wetting front depth by deriving wetting front depth signals from the probe,
    a detection instruction for detecting a depth signal received by the processor from the probe, the depth signal indicating arrival of the wetting front to the initial depth of irrigation, and
    an irrigation stop instruction sent by the processor to the irrigation controller, the stop signal for commanding the irrigation controller to stop irrigation of an irrigation cycle.

8. The system according to the claim 4, wherein the third set of instructions comprises:
    a drainage pause instruction commanding an irrigation pause for a duration relative at least to the soil texture ratio $G_i$ adapted by the irrigation cycle,
    an actual depth $Z_F$ instruction commanding the processor to derive from the probe an actual derived drainage depth $Z_F$ of the wetting front,
    a comparison instruction for commanding the processor to compare an actually derived drainage depth of the wetting front $Z_F$ with the selected final drainage wetting front depth value $Z_{Fi}$, a recalculation instruction for calculating an adapted initial wetting front depth $Z_{Ii}$, if the actual derived depth of the wetting front $Z_F$ differs for more than a predetermined margin from the final drainage depth $Z_{F1}$, the recalculation instruction adapting the soil texture ratio $G_i$ and the initial depth of irrigation $Z_{Ii}$ for a next irrigation cycle, and a continue instruction for the third set of instructions to continue to the fourth set of instructions when the actual derived depth of the wetting front $Z_F$ does not differ for more than a predetermined margin from the final drainage depth $Z_{F1}$.

9. The system according to claim 4, wherein the fourth set of instructions comprises:

a dwell instruction commanding the processor to dwell between successive irrigation cycles, the dwell lasting for a duration relative to at least the adapted ratio $G_i$, and an increment instruction commanding the cycler to raise the irrigation cycle number by one and to return to the second set of instructions for starting a next irrigation cycle.

10. A probe for detecting an irrigation wetting-front depth, the probe operating in association with a processor commanding irrigation cycles started and ended by an irrigation controller, the probe comprising:

a monolithic slender dielectric body having a generally smooth symmetrical external surface and a length defining a longitudinal axis, the body extremities consisting of a forward end having a tapered tip and of a rearward end having a head, a plurality of spaced apart parallel thin electrically conductive electrodes accommodated flush with and girdling the external surface of the probe in perpendicular to and in distribution along the longitudinal axis, and a circuitry embedded inside the body of the probe, the circuitry including a plurality of electrical leads at least equal in number to the plurality of conductive electrodes, the electrical leads being arranged adjacent the external surface, parallel to the longitudinal axis and in equally distant radial distribution relative thereto, the electrical leads being electrically coupled to the conductive electrodes and the circuitry being coupled to the processor, for the processor to sample the circuitry and derive a wetting-front depth across one pair of conductive electrodes selected out of the plurality of conductive electrodes.

11. The probe according to claim 10, further comprising:
a coupling electrically linking each single one conductive electrode out of the plurality of conductive electrodes to only one electrical lead out of the plurality of electrical leads.

12. The probe according to claim 10, further comprising:
an insulation for electrically insulating each single one conductive lead out of the plurality of conductive electrodes coupled to one out of the plurality of conductive leads.

13. The probe according to claim 10, wherein
each pair of two adjacent conductive electrodes out of the plurality of conductive electrodes is amenable to form a sensor and to be sampled by the processor.

14. The probe according to claim 10, wherein
the plurality of conductive electrodes is grouped in sets, each set including one pair of adjacent conductive electrodes, and each set being amenable to form a sensor and to be sampled by the processor.

15. The probe according to claim 10, wherein
any pair of conductive electrodes out of the plurality of conductive electrodes is amenable to form a sensor and to be sampled by the processor.

16. The probe according to claim 10, wherein
the plurality of electrodes is configured for detecting change in soil properties to detect arrival of a wetting front by use of a detection method, selected from the detection methods including impedance, capacitance, radiation and resistance.

17. The probe according to claim 10, wherein
the plurality of conductive electrodes contacts the soil when the probe is inserted in the ground.

18. The probe according to claim 10, wherein the monolithic slender dielectric body is made from plastic material.

19. The probe according to claim 10, wherein the monolithic slender dielectric solid body is extruded.

20. A method for irrigation of an area by a plurality of successive adaptive irrigation cycles starting with a first irrigation cycle, the method comprising the steps of:

initiating and stopping irrigation with an irrigation controller responsive to signals, detecting arrival of a wetting front with a probe having sensors, the probe providing signals associated with the detected wetting front depth, operating a cycler comprising a processor, a memory and an I/O unit, the cycler being coupled to the irrigation controller for emitting signals thereto, and the cycler being coupled to the probe for emitting and for receiving signals therefrom, running on the processor a computer program preloaded in the memory of the processor, the processor controlling adaptive irrigation and managing successive irrigation cycles, the computer program comprising:
a predetermined threshold limit $\Delta R$, and
a predetermined ratio $G_1$ representing soil texture characteristics.

21. The method according to claim 20, wherein running the computer program further comprises the steps of:
using a first initial wetting front depth value $Z_{f1}$ to initiate and stop the first irrigation cycle, and
running a procedure for beginning the first adaptive irrigation cycle to be followed by a plurality of successive adapted irrigation cycles.

22. The method according to claim 20, wherein both the predetermined threshold limit $\Delta R$ and the ratio $G_1$ are selected, in combination, from the group consisting of preset default values and of user-selected inputs.

23. The method according to claim 20, wherein the computer program further comprises the steps of:
running a first set of instructions for performing preliminary setup for the first irrigation cycle, and
running a second set of instructions for initiating irrigation, for tracking a wetting front depth and for stopping irrigation.

24. The method according to claim 20, wherein running the computer program comprises the steps of:
running a third set of instructions for deriving information from a preceding irrigation cycle and for adapting instructions for application to a next irrigation cycle, and
running a fourth set of instructions for beginning the next irrigation cycle and returning to the second set of instructions.

25. The method according to the claim 23, wherein the first set of instructions further comprises the steps of:

using a first initial wetting front depth instruction for the first irrigation cycle i=1, for calculating a first initial wetting front depth $Z_{Ii}$, to stop irrigation, by the equation $Z_{Ii}=G_i*Z_{Fi}$, where $Z_F$ is a final wetting front depth input value selected for optimal irrigation.

26. The method according to claim 23, wherein the second set of instructions comprises the steps of:

detecting an irrigation start instruction sent by the processor to the irrigation controller for commanding the irrigation controller to start an irrigation cycle, a tracking instruction for tracking the wetting front depth by deriving wetting front depth signals from the probe, inserting a detection instruction for detecting a depth signal received by the processor from the probe, the depth signal indicating arrival of the wetting front to the initial depth of irrigation, and reading an irrigation stop instruction sent by the processor to the irrigation controller, the stop signal for commanding the irrigation controller to stop irrigation of an irrigation cycle.

27. The method according to the claim 23, wherein the third set of instructions comprises the steps of:

executing a drainage pause instruction commanding an irrigation pause for a duration relative at least to the soil texture ratio $G_i$ adapted by the irrigation cycle, reading an actual depth $Z_F$ instruction commanding the processor to derive from the probe an actual derived drainage depth $Z_F$ of the wetting front, implementing a comparison instruction for commanding the processor to compare an actually derived drainage depth of the wetting front $Z_F$ with the selected final drainage wetting front depth value $Z_{Fi}$, calculating an adapted initial wetting front depth $Z_{Ii}$, with a recalculation instruction if the actual derived depth of the wetting front $Z_F$ differs for more than a predetermined margin from the final drainage depth $Z_{F1}$, the recalculation instruction adapting the soil texture ratio $G_i$ and the initial depth of irrigation $Z_{Ii}$ for a next irrigation cycle, and applying a continue instruction for the third set of instructions to continue to the fourth set of instructions when the actual derived depth of the wetting front $Z_F$ does not differ for more than a predetermined margin from the final drainage depth $Z_{F1}$.

28. The method according to claim 24, wherein the fourth set of instructions comprises:

executing a dwell instruction commanding the processor to dwell between successive irrigation cycles, the dwell lasting for a duration relative to at least the adapted ratio $G_i$, and effecting an increment instruction commanding the cycler to raise the irrigation cycle number by one and to return to the second set of instructions for starting a next irrigation cycle.

* * * * *